United States Patent
Marhefka

(10) Patent No.: US 10,558,065 B2
(45) Date of Patent: Feb. 11, 2020

(54) LIQUID CRYSTAL WRITING DEVICE WITH SLOW DISCHARGE ERASE

(71) Applicant: Kent Displays Inc., Kent, OH (US)

(72) Inventor: Duane Marhefka, Winona, OH (US)

(73) Assignee: Kent Displays Inc., Kent, OH (US)

( * ) Notice: Subject to any disclaimer, the term of this patent is extended or adjusted under 35 U.S.C. 154(b) by 0 days.

(21) Appl. No.: 15/952,471

(22) Filed: Apr. 13, 2018

(65) Prior Publication Data

US 2019/0317348 A1 Oct. 17, 2019

(51) Int. Cl.

| | |
|---|---|
| *G02F 1/133* | (2006.01) |
| *G02F 1/1333* | (2006.01) |
| *G02F 1/1334* | (2006.01) |
| *G02F 1/137* | (2006.01) |
| *G09G 3/36* | (2006.01) |
| *G06F 3/041* | (2006.01) |
| *G06F 3/0488* | (2013.01) |
| *G06F 3/044* | (2006.01) |

(52) U.S. Cl.
CPC ........ *G02F 1/13306* (2013.01); *G02F 1/1334* (2013.01); *G02F 1/13338* (2013.01); *G02F 1/13718* (2013.01); *G02F 1/133305* (2013.01); *G06F 3/044* (2013.01); *G06F 3/0416* (2013.01); *G02F 2001/133397* (2013.01)

(58) Field of Classification Search
CPC .............................. G06F 3/0416; G06F 3/044
See application file for complete search history.

(56) References Cited

U.S. PATENT DOCUMENTS

| | | | |
|---|---|---|---|
| 4,525,032 A | 6/1985 | Hilsum | |
| 5,437,811 A | 8/1995 | Doane et al. | |
| 5,453,863 A | 9/1995 | West et al. | |
| 6,104,448 A * | 8/2000 | Doane | C09K 19/02 |
| | | | 349/12 |
| 2003/0085863 A1 | 5/2003 | Ma et al. | |
| 2003/0146894 A1* | 8/2003 | Angele | G02F 1/1391 |
| | | | 345/97 |
| 2007/0109244 A1* | 5/2007 | Okada | G09G 3/3651 |
| | | | 345/94 |
| 2009/0096942 A1 | 4/2009 | Schneider et al. | |

(Continued)

OTHER PUBLICATIONS

International Search Report and Written Opinion for PCT/US2019/018240 dated Jun. 20, 2019, 19 pages.

(Continued)

*Primary Examiner* — Md Saiful A Siddiqui
(74) *Attorney, Agent, or Firm* — Serbinowski LLC

(57) ABSTRACT

A liquid crystal writing device includes a dispersion of cholesteric liquid crystal and polymer; a flexible substrate on which a user applies pressure that changes a texture of the cholesteric liquid crystal to form an image; electrically conductive layers between which the dispersion is disposed; and electronics adapted to apply an erase voltage waveform across the electrically conductive layers that forms a focal conic texture and erases the image. The erase voltage waveform includes: i) an erase portion at an erase voltage VE, the erase voltage VE being at least as high as a planar to homeotropic transition start voltage (VPH0) of the cholesteric liquid crystal, and ii) a slow discharge portion that lasts for a time $t_d$ that is at least 10 ms.

24 Claims, 11 Drawing Sheets

(56) References Cited

U.S. PATENT DOCUMENTS

| | | | |
|---|---|---|---|
| 2011/0050678 A1* | 3/2011 | Campbell | G09G 3/3629 345/214 |
| 2011/0090412 A1* | 4/2011 | Mori | G02F 1/133362 349/12 |
| 2014/0111717 A1 | 4/2014 | Hughes | |
| 2016/0018681 A1 | 1/2016 | Chien et al. | |

OTHER PUBLICATIONS

Spin Master statement; Device offered for sale at least as early as Oct. 1, 2017; 4 pages.

* cited by examiner

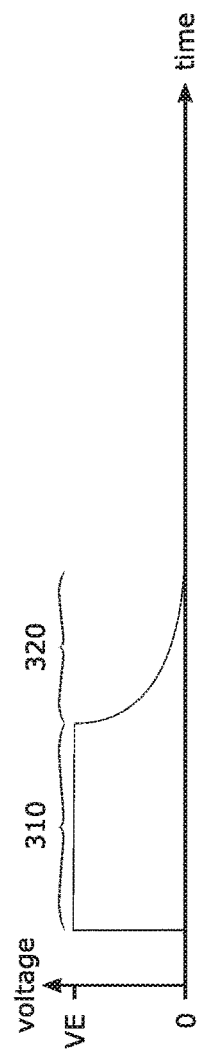
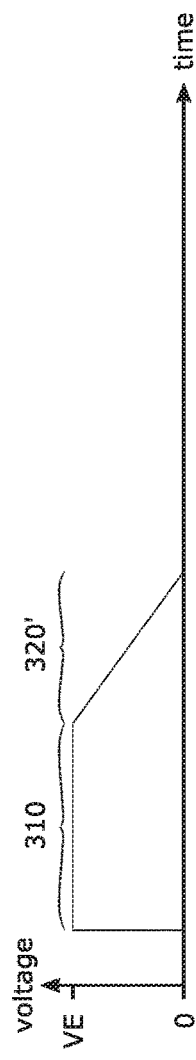
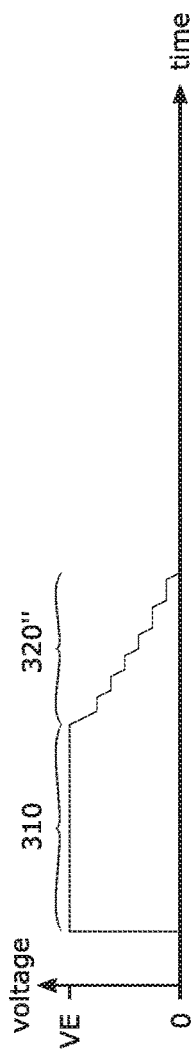
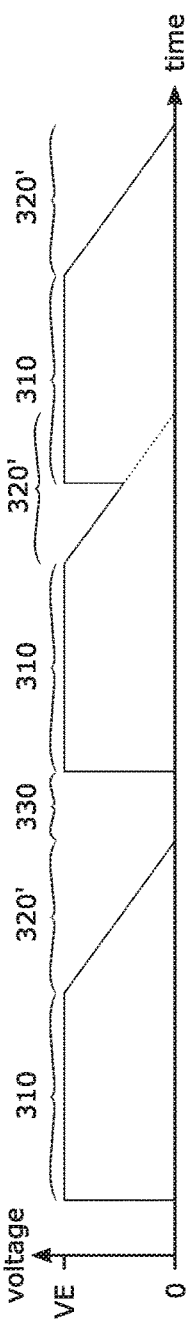

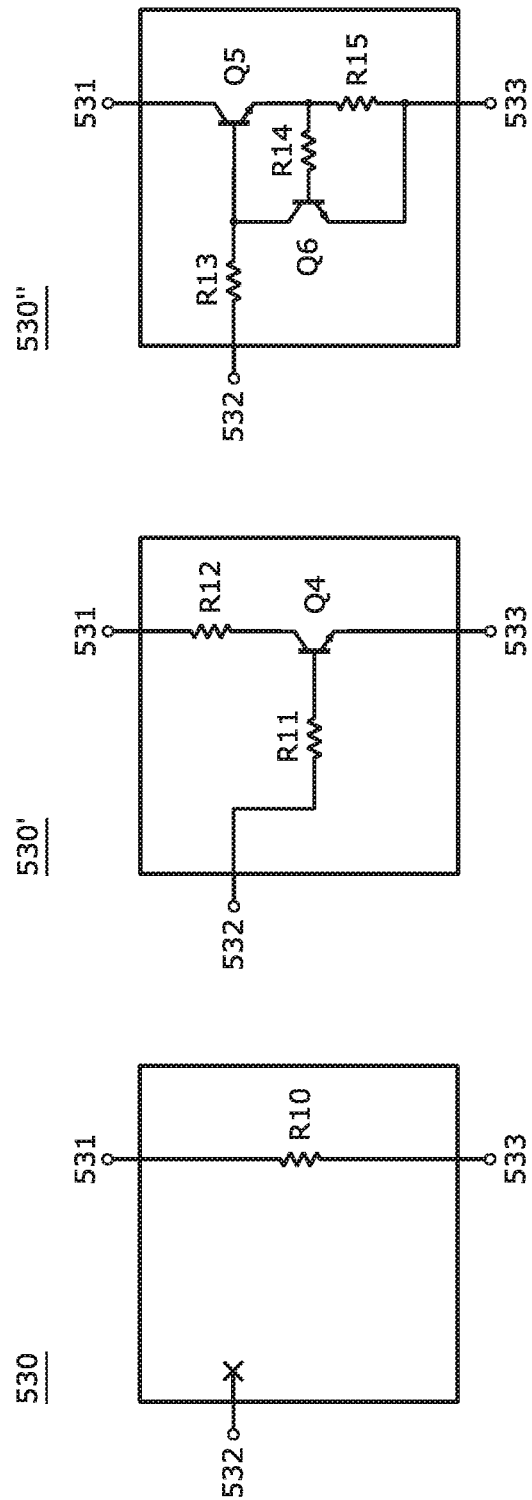

LIQUID CRYSTAL WRITING DEVICE WITH SLOW DISCHARGE ERASE

TECHNICAL FIELD

This disclosure relates to a liquid crystal writing device providing new low power, low cost drive circuitry and energy-efficient waveforms to erase the liquid crystal writing/drawing surface.

BACKGROUND OF THE DISCLOSURE

There have been various technological approaches to produce a writing device as a replacement of paper and pencil or chalk on slate. The best known examples are toys. The ETCH-A-SKETCH™, introduced in the 1960s, is one such device. In this device, a movable stylus removes a powder material from inside a screen to make a dark line. The image is erased by turning the device upside down and shaking it to smooth out the surface. Another famous example is the MAGNA DOODLE™, which is a magnetophoretic device in which a stylus with a magnet on the tip is used as the pen to draw a line. The device is erased with a thin long magnet behind the screen. Over 40 million of these devices have been reportedly sold.

Other liquid crystal writing devices have also been proposed. U.S. Pat. No. 4,525,032 to Hilsum is one such example where cholesteric or a smectic liquid crystal is used to provide a semi-permanent record of the path traced by a stylus on a display and used as a re-usable writing pad. According to Hilsum a layer of a liquid crystal material is contained between two substrates. A stylus having a tip contacts the front substrate and changes the state of selected areas of the liquid crystal layer at positions adjacent the pen tip to provide observable information corresponding to the pen movement. The pen may have a pointed tip, a heated tip, a light emitting tip, or a tip connected to a high voltage high impedance source. At least one substrate of the display can be deformable, thin, or flexible so that the liquid crystal layer may be changed from one state to another by localized application of pressure, heat, light, electrostatic charge, or an electric field. The resultant image on the display is erased by deformation of the layer, e.g. flexing, heating and cooling, or by an electrical field.

A practical problem with the Hilsum device is erasing the image. It is slow and inconvenient to heat or flex the device to erase the image. Hilsum discloses an electronic means of erasure using a special cholesteric liquid crystal in which the frequency of an AC field is applied to the stylus or electrodes. The frequency is changed to enable a writing state or an erasure state. However, this is not without problems in that crossover frequency between writing and erasing is strongly temperature dependent and the frequencies as well as the voltages are very high, consuming a lot of power causing very limited battery lifetime.

A considerable improvement was made with the discovery of bistable cholesteric liquid crystals (see U.S. Pat. No. 5,453,863). Cholesteric liquid crystalline materials are unique in their optical and electro-optical features. These materials possess a helical structure in which the liquid crystal (LC) director twists around a helical axis. The reflected light is circularly polarized with the same handedness as the helical structure of the LC. They can be tailored to Bragg reflect light at a pre-selected wavelength and bandwidth by controlling the pitch of the helical twist through the concentration of chiral dopants and the birefringence of the nematic host, respectively. If the incident light is not polarized, it will be decomposed into two circular polarized components with opposite handedness and one of the components reflected.

The cholesteric material is typically electrically switched to either one of two stable textures; planar or focal conic as described, for example, in the U.S. Pat. No. 5,453,863. In the planar texture, the director of the LC (direction of the long axis of the molecule) is uniformly parallel to the plane of the substrates across the cell but has a helical twist perpendicular to the plane of the substrates. It is the helical twist of the uniform planar texture that Bragg reflects light in a selected wavelength band. The focal conic texture contains defects that perturb the orientation of the liquid crystalline helices. In the typical focal conic texture, the defect density is high; thus the helical domain size becomes small and randomized in orientation such that it is just weakly scattering and does not reflect impinging light (i.e., it is substantially transparent to incident light). Once the defect structures are created, they are topologically stable and cannot be removed unless by some external force such as an electric field or melting the material out of the liquid crystalline phase to the isotropic. Thus, the focal conic texture remains stable and forward scatters light of all wavelengths into an absorbing (usually black) background. These bistable structures can be electronically switched between each other. Gray scale is also available within a single pixel through various switching schemes in order to adjust the density of reflective helical domains that are oriented perpendicular to the substrates (planar texture) to the randomized forward scattering domains (focal conic texture).

In a cholesteric liquid crystal display (LCD), the liquid crystal is typically sandwiched between two substrates that are spaced to a particular gap. The substrates can be either glass or polymer. The bottom substrate is painted with a light absorbing (black or colored) background. The cell gap is usually set by polymer or glass spacers that are either cylindrical or spherical in shape. In most cholesteric liquid crystal displays, the cell gap is not intentionally changed. If one presses on the top substrate of the cholesteric LCD, the liquid crystal can be displaced (since fluids are not very compressible) and induced to flow radially out of the area. Of principle interest is that when the focal conic texture of the cholesteric liquid crystal is induced to flow, the resulting texture is the planar state. The reflective planar state contrasts well to the dark focal conic background. This is a principle behind U.S. Pat. No. 6,104,448 "Pressure Sensitive Liquid Crystalline Light Modulating Device and Material," incorporated herein by reference in its entirety, which discloses that application of a mechanical stress to the liquid crystalline light modulating material changes an initial light scattering focal conic texture to the light reflecting planar texture. U.S. Pat. No. 6,104,448 discloses a polymer network that is soluble with the chiral nematic liquid crystal and phase separates to form separated polymer domains that stabilize the thickness of the cell structure.

In U.S. Pat. No. 6,104,448, an image can be written on the device with an untethered stylus or fingernail. The entire image is erased with the push of a button that applies a low voltage DC pulse to the cholesteric device. An advantage of bistable cholesteric materials is that an image created on the writing device does not degrade with time and lasts indefinitely without application of an electric field, until erased. However, use of a low voltage DC pulse to erase a cholesteric device as disclosed in U.S. Pat. No. 6,104,448 leaves the device susceptible to ghosting, in which the image to be erased is still faintly visible even after the erase has been completed. The voltage level of the pulse must also be accurate, as too low of a voltage results in some of the bright planar domains in the image remaining in the bright planar texture, and too high of a voltage results in homeotropically aligning some of the cholesteric material such that it goes to the bright planar texture upon removal of the pulse.

Prior art erase waveforms for a writing/drawing surface containing a cholesteric liquid crystal display or LCD (e.g., the erase waveforms used in a Boogie Board® eWriter by Kent Displays, Inc.) which address problems with ghosting are shown in FIG. 1A. The eWriter (liquid crystal writing device) of FIG. 1A contains two inputs designated A and B, into which drive waveforms VA and VB are applied, respectively, in order to erase the display to the dark focal conic state. The drive waveforms, VA and VB, consist of 3 levels: 0V, VFC (voltage focal conic) and VP (voltage planar). While each of these levels is zero or positive, the resultant voltage waveform seen across the display (VA-VB), is bipolar and consists of the levels 0V, ±VFC, and ±VP. Typical durations for the pulses (positive or negative) in the resultant waveform are 150 milliseconds (ms), with 50 ms between pulses.

The ±VP (voltage planar) pulses drive the liquid crystal to the homeotropic state from both the planar and focal conic initial textures in order to clear away the previous image. By themselves, these quickly turned off (discharged) pulses would leave the display in the bright (reflecting) planar texture. The ±VFC pulses are required to put the display in the dark (nonreflecting) focal conic texture in preparation for new writing/drawing. The time between pulses has the function of creating added turbulence within the liquid crystal to help eliminate ghosting of the previous image. Another function of the time between pulses is reducing power consumption by discharging the display prior to applying a pulse of opposite polarity. The DC-balance of the resulting waveform enables the display to undergo continual, repeated switching without failures which might otherwise occur due to ionic impurities within the display.

FIG. 2 provides a schematic representation of the display drive circuitry used to create the waveform of the prior art. The cholesteric liquid crystal display (LCD) writing/drawing surface 200 (represented internally as a capacitor) has two drive terminals 210 and 220. High-side drivers 250 are provided to connect the drive terminals 210 and 220 to a high voltage supply 240. Low-side drivers 260 are provided to connect the drive terminals 210 and 220 to ground. Current-limiting resistors 230 (optional) are included between drive terminals 210 and 220 and drivers 250 and 260. Control signals 270 through 273 are sequenced to enable/disable the drivers in order to produce the required drive waveforms at drive terminals 210 and 220. In coordination, high voltage supply 240 is configured to output VP during the first two pulses and VFC for the remaining pulses.

The prior art for erasing the writing/drawing surface relies on approaches originally developed for glass-based cholesteric LCD signage products. The displays in these products required DC-balanced drive waveforms with precise voltage levels in order to effectively erase, with the drive waveforms often producing a visible flash on the display during the erase.

It would be useful to produce electronic liquid crystal writing devices with erase functionality developed specifically for the flexible cholesteric liquid crystal writing/drawing surface of these devices. Such devices would benefit from reduced size, complexity, and cost in the boost converter and drive circuits, while also improving energy efficiency and eliminating visible display flashes during erase.

SUMMARY OF THE DISCLOSURE

A liquid crystal writing device of a first aspect of this disclosure features a dispersion of cholesteric liquid crystal and polymer; a flexible substrate on which a user applies pressure that changes a texture of the cholesteric liquid crystal to form an image; electrically conductive layers between which the dispersion is disposed; and electronic circuitry adapted to apply an erase voltage waveform across the electrically conductive layers that forms a focal conic texture and erases the image. The erase voltage waveform includes: i) an erase portion at an erase voltage VE, the erase voltage VE being at least as high as a planar to homeotropic transition start voltage (VPH0) of the cholesteric liquid crystal, and ii) a slow discharge portion that lasts for a time $t_d$ that is at least 10 milliseconds (ms). One of ordinary skill in the art would realize in reading this disclosure that although the meaning of "slow discharge portion" and its duration can vary depending on the liquid crystal material and eWriter design, it is longer than the instantaneous drop in voltage from erase voltage to zero that occurs using prior art square waveforms. The erase voltage waveform can be generated by lower cost and complexity electronics, is more energy efficient than prior art erase waveforms for eWriters, and eliminates visible flashes during erase that are typical of erase waveforms used in prior art eWriters.

Any of the electronic writing devices including cholesteric liquid crystal, also known as eWriters, by Kent Displays, Inc. may be modified, as understood by one of ordinary skill in the art in view of this disclosure, to utilize the slow discharge erase and/or erase electronics of this disclosure including the eWriters disclosed in U.S. Pat. No. 9,116,379, and in published patent application Pub. Nos.: US 2010/0265214 and US 2016/0342023, which are incorporated herein by reference in their entireties.

In one embodiment using unipolar waveforms, the liquid crystal writing devices of this disclosure have low-cost, low-complexity, low-power erase functionality. In particular, the high-side 250 and low-side 260 driver blocks of the prior art drive circuitry each require multiple components in order to implement. Eliminating these blocks reduces circuitry size and cost, as well as reduces controller (not shown) size and cost by reducing the number of control signals 270 through 273 that must be generated. In another embodiment using bipolar waveforms, advantages of the present subject matter still occur even though the liquid crystal writing devices do not eliminate the high-side/low-side driver blocks and add further complexity. Further benefit comes from reducing the number of voltage levels which must be generated by the boost supply (VFC and VP) as well as the required accuracy of these voltages. While VP must only be above a certain threshold high enough to homeotropically align the liquid crystal directors, VFC must be accurate within a few volts to achieve a good dark state in the circuitry used with the prior art writing/drawing surface. And finally, a more energy efficient erase is achieved by reducing the number of pulses in the erase waveform of this disclosure, which each require energy to charge the capacitance of the cholesteric liquid crystal writing/drawing surface. Any reduction in the number of pulses provides the added benefit of reducing visible flashing of the writing/drawing surface during the erase. Furthermore, bright flashes are completely eliminated by using a drive waveform which ensures that liquid crystal domains in the homeotropic state transition to the dark focal conic texture rather than to a bright planar texture.

Referring now to more specific features of the first aspect of the present disclosure, the time $t_d$ is any of the following: at least 25 ms, at least 50 ms, at least 56 ms, at least 64 ms, at least 80 ms; at least 150 ms, at least 0.5 second, at least 1 second; at least 2 seconds; at least 3 seconds; and at least 10 seconds. These values for $t_d$ are provided as examples and should not be interpreted to unduly limit the subject disclosure. Another specific feature is that the erase voltage waveform is a unipolar waveform. A further specific feature is that the erase voltage waveform is a bipolar waveform. Yet another feature is that the erase voltage VE is higher than both a planar to homeotropic transition voltage (VPH) and a focal conic to homeotropic transition voltage (VFH). More specifically, another feature is wherein the erase portion of the erase voltage waveform is instantaneous. Still further, a feature is that the erase voltage waveform lasts for a time $t_e$ which is at least 150 ms. It should be appreciated that the specific features listed in the Summary of the Disclosure can be used in any combination with each other, in the alternative and with features of the Detailed Description. Specific features of the first aspect of the disclosure can be used in connection with the second and third aspects thereof and vice versa.

Another specific feature of the first aspect is that the electronics provide the slow discharge portion of the erase voltage waveform with at least one of the following: (i) an RC discharge characteristic; (ii) voltage discharge at constant current and (iii) a stepped discharge characteristic.

Other specific features of the first aspect are any of the following. The bipolar waveform includes more than one pulse and each said pulse includes said slow discharge portion. In another feature the writing device has no planar flash when erasing and no image sticking when either the unipolar erase waveform or the bipolar erase waveform is used. Planar flashes, in which the liquid crystal appears bright, may be avoided by including a slow discharge that prevents a planar texture from forming in the liquid crystal after any section of the erase waveform of sufficient amplitude to drive the liquid crystal into the homeotropic state. Image sticking, which is also called ghosting and refers to part of the image remaining visible even after an erase, may be avoided by proper selection of erase voltage waveform parameters.

It should be appreciated in all aspects and embodiments of the subject disclosure that erase to the focal conic texture at lowest reflectivity is contemplated. Nevertheless, some amount of gray scale might be tolerated in the erased eWriter without departing from the spirit and scope of this disclosure, as achieved in any manner, for example, by using a shortened slow discharge portion of the erase voltage waveform, or time $t_d$.

Moreover, it should also be appreciated that in this disclosure values of the erase voltage VE can be positive or negative and unless otherwise stated, either voltage is contemplated as well as modifications to achieve either polarity.

Turning now to one specific feature of electronics of the first aspect, the electronics comprise a boost converter circuit including an output terminal at the erase voltage VE. The erase voltage waveform is applied across the electrically conductive layers and a resistor is disposed relative to the electrically conductive layers at a resistance selected to produce the slow discharge portion of the erase voltage waveform.

In another specific feature of electronics of the first aspect, the electronics comprise a timing circuit, a switch and a regulated power source or a battery for providing power including voltage input to the boost converter circuit. The timing circuit is adapted to detect a signal from the switch enabling the timing circuit to send an enable signal to an input of the boost converter circuit whereby the boost converter circuit outputs the erase voltage VE.

In yet another specific feature of electronics of the first aspect, the electronics comprise a switch and a regulated power source or a battery for providing power to the electronic circuitry including voltage input to the boost converter circuit. A duration at which the switch is activated controls a duration of an enable signal to an input of the boost converter circuit whereby the boost converter circuit outputs the erase voltage VE.

In still another specific feature of electronics of the first aspect, the electronics comprise a regulated power source or battery for providing power voltage VDD and a boost converter circuit including an output terminal at a voltage equal to the erase voltage VE+power voltage VDD. One of the electrically conductive layers is at the output terminal voltage and another of the electrically conductive layers is at the power voltage VDD. A resistor is configured to produce a desired duration of the slow discharge portion of the erase voltage waveform.

In a second aspect of the present disclosure a cholesteric liquid crystal eWriter forms an image by applying pressure to a writing/drawing surface comprising a liquid crystal layer including a dispersion of cholesteric liquid crystal material and polymer. Electrically conductive layers are provided between which the liquid crystal layer is disposed. Electronics of the eWriter are adapted to apply an erase voltage waveform across the electrically conductive layers that forms a focal conic texture and erases the image. The erase voltage waveform includes an erase portion and a slow discharge portion. The electronics comprise:

a regulated power source or a battery having a voltage VDD;
a controller including a voltage VDD input, a switch SW input, an enable EN output, a boost BST output, a feedback FB input and an optional discharge DCHG output;
a transistor Q3 acting as a switch controlled by an enable signal from the enable EN output of the controller;
a boost converter circuit including: a transistor Q1 acting as a switch controlled by a boost signal from the BST output of the controller, a diode, an inductor located between the switch Q3 and the diode, and a capacitor C1 in parallel with the writing/drawing surface;
the boost converter circuit including a feedback circuit configured to provide feedback to the FB input of the controller based on a boost converter output voltage from the boost converter circuit;
a discharge circuit optionally under control of a discharge signal from the DCHG output of the controller.

In response to a control signal instructing erase of the image applied to the switch SW input, the controller turns on the transistor Q3 applying the voltage VDD to the boost converter circuit. The feedback circuit indicates to the controller via the feedback FB input when the boost converter output voltage is below a set level, resulting in the controller enabling the signal from the output BST that turns on the transistor Q1 and causes energy to be stored in the inductor. When the controller subsequently turns off the transistor Q1, the energy stored in the inductor is discharged through the diode increasing the erase voltage on the capacitor C1 and increasing the erase voltage in the parallel writing/drawing surface forming the erase portion of the erase voltage waveform, and the discharge circuit produces the slow discharge portion of the erase voltage waveform.

While the system controller is described in the disclosure as a microcontroller it is understood that other types of controller types could be used, for instance devices based on field programmable gate arrays (FPGA's) or application specific integrated circuits (ASIC's) with controller logic implemented by a suitably designed state machine.

Turning now to specific features of the second aspect of the disclosure, the feedback circuit includes a resistive voltage divider adapted to produce the FB input to the controller as a scaled version of the boost converter output voltage, the boost converter output voltage regulating to a scaled value of VFB. VFB is the voltage level to which the controller regulates the FB input by pumping or not pumping the boost converter circuit. The pumping of the boost converter circuit outputs a series of pulses on the BST signal, with each pulse causing the voltage on capacitor C1 to increase, until the boost converter output voltage reaches the set level.

In another specific feature of the second aspect of the disclosure, the feedback circuit includes a Zener diode and a resistor. The feedback circuit is adapted to regulate the boost converter output voltage to VFB+VZ, where VZ is the Zener diode voltage and VFB is the voltage level to which the controller regulates its FB input by pumping/not pumping the boost converter circuit. The pumping of the boost converter circuit outputs a series of pulses on the BST signal, with each pulse causing the voltage on capacitor C1 to increase, until the boost converter output voltage reaches the set level.

In yet another specific feature of the second aspect of the disclosure the discharge circuit includes a resistor configured to provide an RC discharge characteristic to the slow discharge portion of the erase voltage waveform.

In a further specific feature of the second aspect of the disclosure the discharge circuit includes a resistor and a transistor Q4 acting as a switch that is under control of the discharge signal DCHG output from the controller. The controller turns OFF the transistor Q4 while the boost converter circuit is enabled, saving power, and then turns ON the transistor Q4 when the boost converter circuit is disabled, enabling the boost converter circuit output voltage to discharge through the resistor.

In another specific feature of the second aspect of the disclosure the discharge circuit is configured to form the slow discharge portion of the erase voltage waveform by discharging voltage at constant current.

Still further as a feature of the second aspect, the discharge circuit includes a transistor Q5 acting as a current-limited switch that is under control of the discharge signal from the DCHG output of the controller. A sense resistor R15 produces a voltage proportional to the current being discharged from the boost converter circuit output through the transistor Q5. A transistor Q6 limits the discharge current by drawing current away from the base of the transistor Q5 when the voltage across the sense resistor becomes large enough to turn on the transistor Q6. The controller turns OFF the transistor Q5 while the boost converter circuit is enabled, saving power, and then turns ON the transistor Q5 when the boost converter circuit is disabled, enabling the boost converter output voltage to discharge at the current limit set by the sense resistor R15.

In a third aspect of the present disclosure a cholesteric liquid crystal eWriter forms an image by applying pressure to a writing/drawing surface comprising a liquid crystal layer including a dispersion of cholesteric liquid crystal material and polymer. Electrically conductive layers are provided between which the liquid crystal layer is disposed. Electronics of the eWriter are adapted to apply an erase voltage waveform across the electrically conductive layers that forms a focal conic texture and erases the image. The erase voltage waveform includes an erase portion and a slow discharge portion. The electronics comprise:

a regulated power source or a battery having a voltage VDD;
a controller including a voltage VDD input, a switch SW input, an enable EN output, a boost BST output, and a feedback FB input;
a transistor Q2 acting as a low-side switch controlled by an enable signal from the EN output of the controller and referenced to ground;
a boost converter circuit including a transistor Q1 acting as a switch controlled by a boost signal from the BST output of the controller, an inductor, a diode D2, a capacitor C1 electrically connected to the cathode of diode D2 and to a first one of the electrically conductive layers,
a voltage on the capacitor C1 being an output from said boost converter circuit;
the boost converter circuit including a feedback circuit configured to provide feedback to the FB input of the controller;
an optional current limiting resistor located in a path between a second of the electrically conductive layers and the transistor Q2;
a discharge resistor R6 connected across the electrically conductive layers.

In response to a control signal instructing erase of the image the controller turns on the transistor Q2 providing the ground reference to the boost converter circuit. The feedback circuit is configured to indicate to the controller when a boost converter voltage appearing on the capacitor C1 output from the boost converter circuit is below a set level, resulting in the controller enabling the boost signal that turns ON the transistor Q1 and causes energy to be stored in the inductor. When the controller subsequently turns OFF the transistor Q1, the energy stored in the inductor is discharged through the diode D2 increasing voltage on the capacitor C1 and increasing the erase voltage across the writing/drawing surface to form the erase portion of the erase voltage waveform, and the discharge resistor R6 produces the slow discharge portion of the erase voltage waveform.

Turning to specific features of the third aspect of the disclosure, the controller comprises three general purpose digital input/output pins: one for the FB input, one for the BST output and one for the enable EN output.

Yet another feature is wherein the controller includes a fourth general purpose input/output pin coupled to a user controlled switch adapted to produce the control signal that initiates application of the erase voltage.

In a further feature the controller is a microcontroller.

BRIEF DESCRIPTION OF THE DRAWINGS

The features and advantages of the examples of the present invention described herein will become apparent to those skilled in the art to which the present invention relates upon reading the following Detailed description, with reference to the accompanying drawings, in which:

FIGS. 3A, 3B, 3C, and 3D show four unipolar erase waveforms with slow discharge of the subject matter of the present disclosure;

FIGS. 7A, 7B, and 7C show multiple implementations of the discharge circuit in FIG. 5;

DETAILED DESCRIPTION

A liquid crystal writing device of this disclosure features a liquid crystal layer including a dispersion of cholesteric liquid crystal and polymer; a flexible substrate on which a user applies pressure that changes a reflectance of the cholesteric liquid crystal to form an image; electrically conductive layers between which the liquid crystal layer is disposed; and electronic circuitry adapted to apply an erase voltage waveform across the electrically conductive layers, wherein the erase voltage waveform includes a slow discharge portion and forms a focal conic texture in the cholesteric liquid crystal erasing the image.

Unipolar Erase Waveform

Figure 1B:
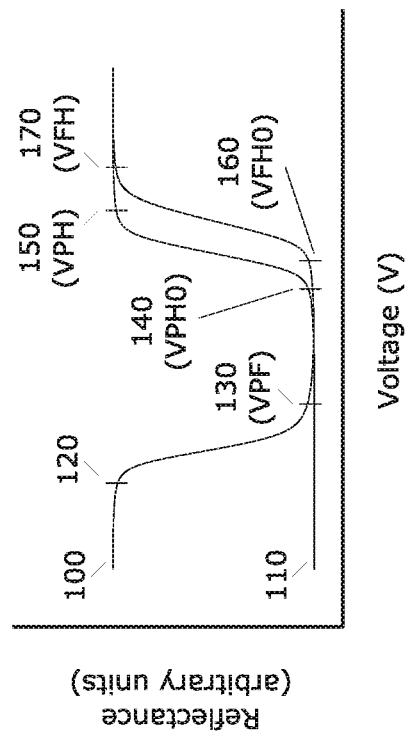
FIG. 1A shows the voltage waveforms, VA and VB, applied to the two terminals (A and B) of the writing/drawing surface, respectively, in order to erase the eWriter of the prior art, while FIG. 1B provides an electro-optical response curve for the writing/drawing surface.

FIG. 1B provides an electro-optical response curve which illustrates the effect of a square voltage pulse of a given duration such as 150 milliseconds applied across the writing/drawing surface on the resulting reflectance of the writing/drawing surface based on either of two initial states, a maximally reflecting (bright) state 100 in which the liquid crystal material is in the planar texture and a minimally reflecting (dark) state 110 in which the liquid crystal material is in the focal conic texture. From the initial bright state, a pulse of an appropriate threshold voltage 120, e.g., in the range of about 0.5 to 2 volts per micrometer of cell thickness, will cause at least a portion of the liquid crystal material to change to the focal conic texture and its reflectance to decrease. A pulse of another threshold voltage, the planar to focal conic transition voltage (VPF) 130, e.g., in the range of about 1 to 6 volts per micrometer of cell thickness, will change the liquid crystal material to the dark state. In between the bright state and the dark state, the reflectance ranges along a grayscale, which is a continuum of reflectance values between the two states. Pulses greater than VPF and below another threshold, the planar to homeotropic transition start voltage (VPH0) 140, e.g., in the range of about 2 to 9 volts per micron of cell thickness, change the liquid crystal material to the dark state. At VPH0, at least a portion of the material initially in the bright state will homeotropically align and switch to the bright state at the end of the pulse, resulting in an optical state with reflectance greater then the dark state. At a yet higher threshold voltage, the planar to homeotropic transition voltage (VPH) 150, all of the material initially in the bright state will homeotropically align and return to the bright state at the end of the pulse, resulting in the writing/drawing surface returning to its maximally reflecting (bright) state.

From the initial dark state 110, pulses below a threshold voltage, the focal conic to homeotropic transition start voltage (VFH0) 160, typically slightly higher than VPH0, will leave the liquid crystal material in the dark state. At VFH0, at least a portion of the material initially in the dark state will homeotropically align and switch to the bright state at the end of the pulse, resulting in an optical state with reflectance greater then the dark state. At a yet higher threshold voltage, the focal conic to homeotropic transition voltage (VFH) 170, all of the material initially in the dark state will homeotropically align and switch to the bright state at the end of the pulse, resulting in the writing/drawing surface switching to its maximally reflecting (bright) state. The focal conic to homeotropic transition voltage, e.g., in the range of about 4 to 13 volts per micron of cell thickness, is typically slightly higher than VPH.

It is to be understood that the voltages per micron necessary to drive the material between optical states may vary depending on the composition of the material, but that the determination of necessary voltages is well within the skill in the art in view of the instant disclosure.

Figure 1A:
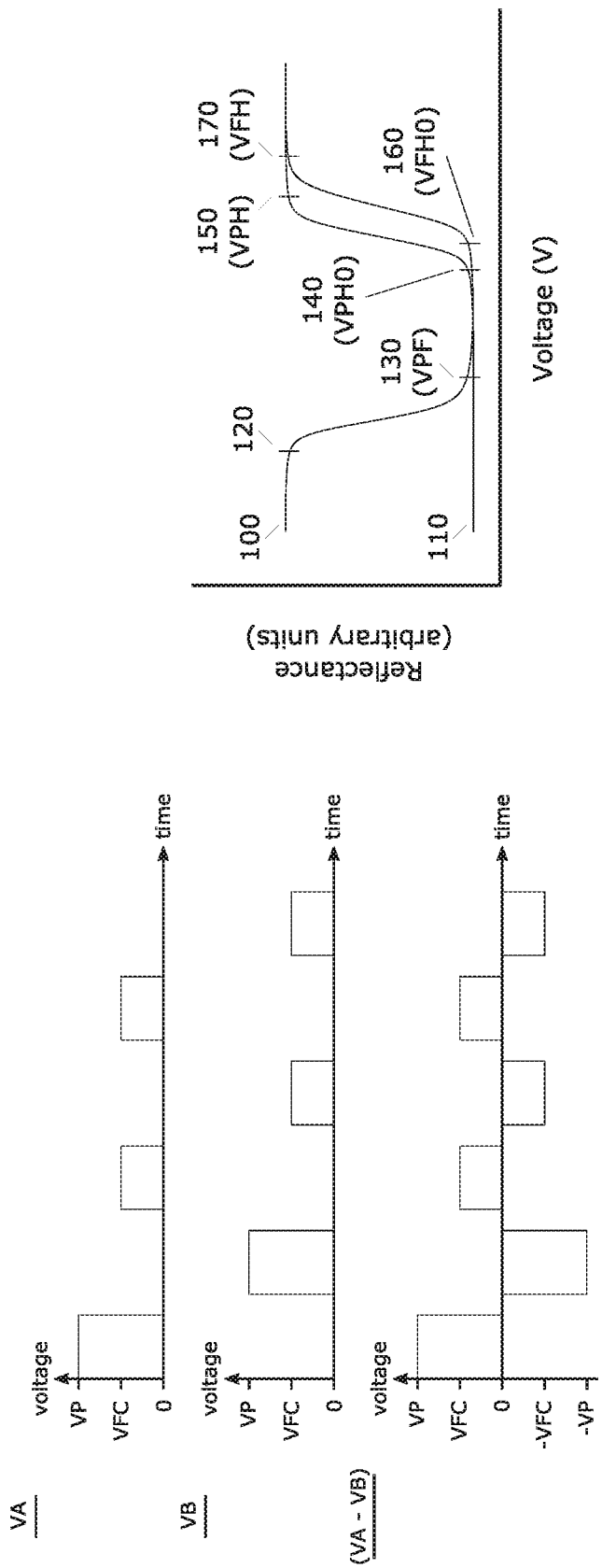

The erase waveforms in FIG. 1A used to erase the writing/drawing surface on prior art eWriters are based on erase techniques developed for electronically addressed graphical displays using electro-optical response curves such as in FIG. 1B, where VP would be selected around VFH or higher and VFC would be selected at a midlevel between VPF and VPH0 to ensure that a good focal conic would be achieved given tolerances in electronics and shifts in VPF and VPH0 threshold levels due to display manufacturing tolerances and temperature. These graphical displays updated in a manner in which the entire display would erase before a new image would be electronically written row by row. The erase was required to be fast in order to minimize the amount of time a user would have to wait before a new image would be displayed. Additionally, because these types of displays are updated under computer control, possibly continuously, the displays had rigorous lifetime requirements in terms of number and frequency of updates. The writing/drawing surface in an eWriter is used and operated differently, however, than a graphical display. In typical use, the writing/drawing surface of the eWriter (liquid crystal writing device) of this disclosure is written or drawn on by applying pressure by hand with a stylus and is erased manually by a user (full erase by activating an erase switch), often with extended intervals between short bursts of activity. Infrequent erasing of the display has a restorative effect that preserves the lifetime of the display even when using erase waveforms that are not DC-balanced. Additionally, users expect the erase to present a blank page for writing, which makes a longer duration erase (during which the writing/drawing surface appears blank) acceptable.

The present disclosure is based on the discovery that these usage and operation model differences between electronically addressed graphical displays and writing/drawing surfaces of eWriters make possible a different erase mechanism. It has long been known that while quickly removing a sufficiently high electric field switches the cholesteric liquid crystal in an electrically addressed graphical LCD to the bright planar texture, removing the field slowly switches the cholesteric liquid cryst al to the dark focal conic texture (see U.S. Pat. No. 5,437,811). However, before now the benefits and applicability of using this slowly reduced field mechanism to switch displays to the focal conic texture has not been recognized and applied to usage in eWriters. Instead, one of ordinary skill in the art was lead in a different direction of precise erase voltage levels and rapid voltage removal according to the design of such graphical cholesteric LCDs, even though eWriters have existed for a long time dating back to the expired U.S. Pat. No. 6,104,448.

FIGS. 3A-D provide four examples of suitable erase waveforms for a writing/drawing surface of eWriters of this disclosure. These unipolar waveforms require a single voltage level, VE, to be produced from a boost supply and include a slow discharge portion of the waveform during which the waveform drops from VE down to 0V. The waveform duration at the VE level 310 is time $t_e$. Although FIG. 1B defines thresholds on the electro-optical response curves for square voltage pulses, these thresholds when obtained for square pulses of duration $t_e$ are also useful in the context of defining suitable values for VE. The voltage used for VE should be at least as high as the planar to homeotropic transition start voltage (VPH0), as any domains which align homeotropically would switch to focal conic by the gradual discharge while other domains which don't align homeotropically would switch directly to focal conic. The slow discharge ensures that all areas of the display switching directly to focal conic experience a voltage level suitable for this transition, easing requirements on display uniformity. Note that prior art waveforms based on square pulses cannot use pulses of amplitude greater than VPH0 for switching to the dark state. Finally, a voltage for VE above both the planar to homeotropic transition voltage (VPH) and the focal conic to homeotropic transition voltage (VFH) is advantageous in that it homeotropically aligns all of the material for maximal effect in eliminating ghosting, with all of the display switching from homeotropic alignment to a dark focal conic texture through the slow discharge. As the erase voltage VE is bound only by minimum thresholds and not ranges, it advantageously does not have tight accuracy requirements.

Time $t_e>0$ and in particular, $t_e$ is at least about 150 ms. For example, room temperature testing using a VE of 23V on a writing/drawing surface with a 2 µm cell gap and VFH of 10V/µm showed that so long as the waveform duration of the slow discharge portion 320, 320', 320" of time $t_d$ is sufficiently long, one can erase by beginning the discharge immediately once the VE level is reached. In this case, while not wanting to be bound by theory, $t_e$ could be infinitesimal or very short. However, a typical value for $t_e$ can be 150 ms. For example, the slow discharge portion 320' for the constant current discharge shown in FIG. 3B (room temperature and using $t_e$=150 ms, VE=23V), showed good erase began when $t_d$ was in a range of about 56 to 68 ms; and good erase was achieved when using longer duration discharge. In another example, the slow discharge portion 320 for RC discharge shown in FIG. 3A (room temperature and using $t_e$=150 ms, VE=23V), showed good erase began when $t_d$ was in a range of about 64 to 80 ms; and good erase was achieved when using longer duration discharge. In this case discharge was considered complete after about 5 to 6 RC time constants, where a single RC time constant is defined as the time it takes the voltage to discharge down to $e^{-1}$ (=0.3679) times its initial value. In a prototype which did not have a way to disable the discharge resistor, the RC discharge portion 320 used a $t_d$ of about 3 seconds to keep the load to a minimum for the VE portion. While not wanting to be bound by theory, in all embodiments longer duration $t_e$ and $t_d$ might avoid ghosting and accommodate variations in temperature. The duration $t_d$ of the slow discharge portion 320, 320', 320", is any of the following: at least 10 ms, at least 25 ms, at least 50 ms, at least 56 ms, at least 64 ms, at least 80 ms; at least 150 ms; at least 0.5 second, at least 1 second; at least 2 seconds; at least 3 seconds; and at least 10 seconds. For example, for constant current discharge at a minimum the duration $t_d$ of the slow discharge portion 320' is in a 56 to 68 ms range, and the erase stays good for longer durations of slow discharge. For the RC discharge, at a minimum the duration $t_d$ of the slow discharge portion 320 is in a 64 to 80 ms range, and the erase stays good for longer durations of slow discharge. The drive waveform parameters (magnitude VE, duration of VE portion, $t_e$, and duration of slow discharge, $t_d$) will vary depending upon the nature and amount of the particular liquid crystal and polymer used, as well as temperature, but could be easily determined by one of ordinary skill in the art in view of the instant disclosure. FIGS. 3A-D are not drawn to scale and are an approximation of voltage behavior over time that should not be used to limit the present disclosure. The slow discharge portion 320, 320', or 320" of the waveforms of FIG. 3 may be shorter or longer, even much longer, than the VE voltage portion 310 of the waveform. Also the slope and shape of the slow discharge portions of the waveforms may vary from what is shown in the drawings without departing from the spirit and scope of the subject matter of this disclosure.

The slow discharge portion of the waveform 320 in FIG. 3A is produced using a simple resistor placed across writing/drawing surface terminals 210 and 220 in order to discharge the voltage across the liquid crystal capacitance. The slow discharge portion of the waveform 320' in FIG. 3B is produced using additional circuitry configured to discharge the voltage across the liquid crystal capacitance at a constant current. Finally, the slow discharge portion of the waveform 320" in FIG. 3C is produced using additional control to intermittently discharge the voltage across the liquid crystal capacitance (using methods similar to those in FIGS. 3A or 3B) in order to produce an adjustable discharge characteristic consisting of a series of step levels. Despite their relative differences in shape, though, each of the erase voltage waveforms of FIGS. 3A, 3B, and 3C is characterized by a slow discharge portion, making the waveforms much different than the square erase voltage pulses used in prior art eWriters (e.g., see FIG. 1A) and in graphical displays.

The erase waveforms in FIGS. 3A, 3B, and 3C are energy efficient because there is only a single drive pulse (the liquid crystal capacitance is charged only one time). Furthermore, there is no flashing on the eWriter as the single, slowly discharged drive pulse does not produce a planar texture. However, as shown in FIG. 3D, erase waveforms of this disclosure may also include two or more drive pulses. While FIG. 3D shows multiple pulses of the type in FIG. 3B, any type or combination of types of the pulses in FIGS. 3A, 3B, or 3C may be used. In some instances, pulses may be separated by a time interval 330, as shown in FIG. 3D between the first and second pulse. In other instances, time interval 330 between pulses may be reduced to zero. In yet other instances, the slow discharge portion of a pulse 320, 320', or 320" may be truncated such that the next pulse begins before the earlier pulse has completely discharged, as shown in FIG. 3D where the waveform duration at the VE level 310 of the third pulse begins before the slow discharge portion 320' of the second pulse is complete. The use of additional pulses may provide added protection against ghosting at the expense of additional energy consumption for each pulse. Even with multiple pulses, there is no bright flashing during the erase as the slow discharge prevents formation of the planar texture.

Electronics

Figure 4:
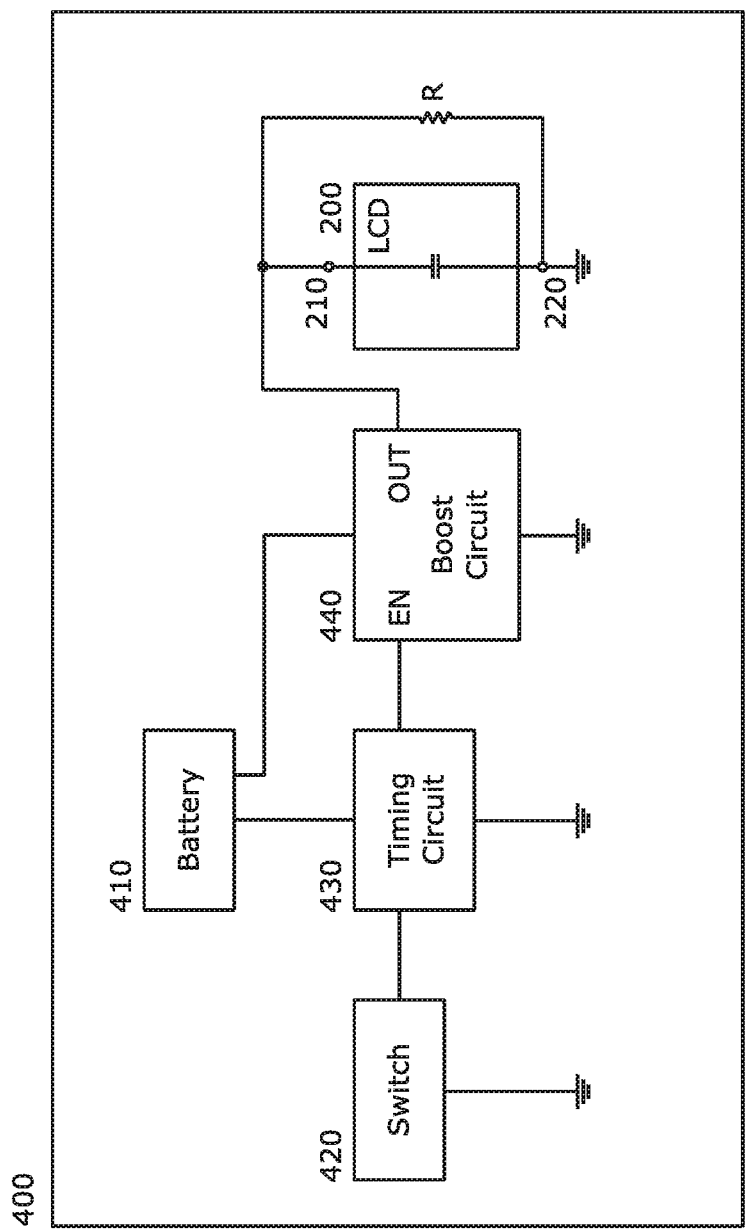
FIG. 4 shows a block diagram of electronics for implementing the waveform of FIG. 3A according to the present disclosure.

FIG. 4 shows a block diagram of a liquid crystal writing device 400 implementing the erase waveform of FIG. 3A. The device includes a battery 410 to power the device. A switch 420 is activated by a user to trigger the device to erase the writing/drawing surface 200 (LCD). In all embodiments herein, the terms "writing/drawing surface" and "LCD" are used interchangeably with the eWriter structure including a liquid crystal layer including a dispersion of cholesteric liquid crystal and polymer and optional spacers, a flexible substrate on which a user applies pressure that changes a texture of the cholesteric liquid crystal to form an image, and electrically conductive layers between which the liquid crystal layer is disposed. Further, in all embodiments herein, drive terminals 210 and 220 are each connected to a separate one of the two electrically conductive layers between which the liquid crystal layer is disposed, such that a voltage across the drive terminals is used interchangeably with a voltage across the display, a voltage across the writing/drawing surface, a voltage across the electrically conductive layers, or a voltage across the liquid crystal capacitance. The switch 420 activation is detected by a timing circuit 430 which asserts an enable signal to the enable input EN of the boost circuit 440 for a fixed amount of time. The timing circuit may trivially connect the switch 420 directly to the boost circuit 440 enable input EN, in which case timing is controlled by the duration in which the user presses the switch. Alternatively, timing may be controlled using an RC circuit, a one-shot (monostable multivibrator), or other means familiar to one of ordinary skill in the art to provide an enable signal of desired duration to the enable input EN of the boost circuit 440. The boost circuit 440 sources current to support an erase voltage VE at its output OUT when the enable signal EN is asserted and zero current when not asserted. The writing/drawing surface drive terminal 210 is connected to the boost circuit 440 output OUT and terminal 220 to ground, causing voltage VE to appear across the writing/drawing surface 200 while the boost circuit 440 is enabled. A resistor, R, placed across writing/drawing surface terminals 210 and 220 is sized to produce the desired discharge rate based on the particular liquid crystal display once the boost circuit 440 is disabled. Equivalently, the boost circuit 440 could be used in an inverting configuration which sinks current to support an erase voltage −VE at its output OUT when the enable signal EN is asserted and zero current when not asserted. Thus, the erase mechanism can work with either polarity of unipolar pulse. The boost circuit quickly charges the liquid crystal layer up to erase voltage VE. During the time the boost circuit is enabled, it holds the voltage across the writing/drawing surface 200 at erase voltage VE by continually providing charge to replace that drained off by the resistor R. Once the boost circuit is no longer enabled, the charge drained off by the resistor R causes the voltage to fall as illustrated in FIG. 3A.

In an alternative embodiment, the boost circuit in FIG. 4 sources current to support the battery voltage VDD at its output OUT when the boost circuit is disabled. In this case, the ground connection of terminal 220 may be replaced with a connection to VDD such that 0V appears across the writing/drawing surface 200 (terminals 210 and 220 both at VDD) when the boost converter is disabled and the liquid crystal capacitance has discharged through resistor R. Adapting the boost circuit to output a voltage of (VE+VDD) enables the desired erase voltage VE to appear across the writing drawing/surface when the boost circuit is enabled, with terminal 210 at (VE+VDD) and terminal 220 at VDD. The erase waveform of FIG. 3A is produced across writing/drawing surface 200 (terminal 210 voltage minus terminal 220 voltage), with terminal 210 slowly discharging to VDD through resistor R when the boost converter is disabled.

Microcontroller-Based System

Figure 5:
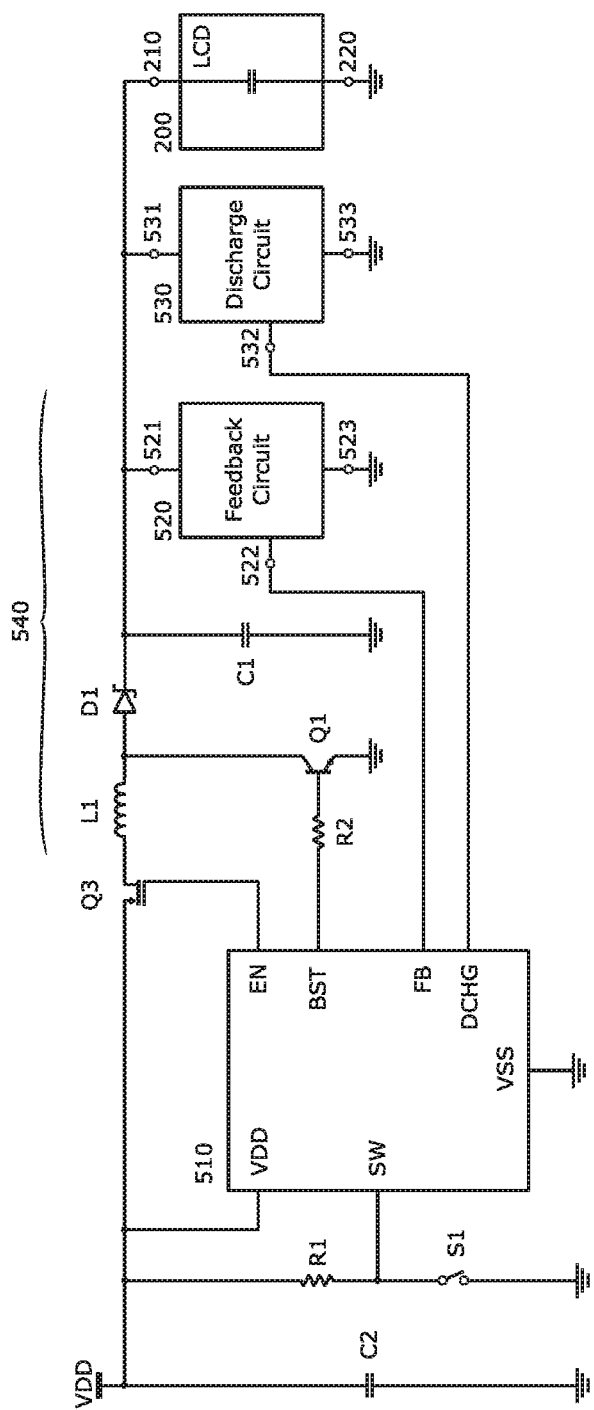
FIG. 5 shows a controller-based system for a liquid crystal writing device of the present disclosure adaptable to produce all of the erase waveforms in FIGS. 3A, 3B, 3C, and 3D.

An alternative embodiment featuring a microcontroller 510 (e.g., Texas Instruments MSP430G2111) is shown in FIG. 5. Power (VDD) is supplied to the de vice from a regulated source or directly from a battery. A user signals the microcontroller 510 to erase the writing/drawing surface by activating (e.g., pressing) switch 51, which pulls the normally high SW input to the microcontroller 510 low. Firmware in the microcontroller detects this change and, after optionally debouncing the signal, initiates generation of the desired erase waveform to the writing/drawing surface 200 (LCD). In this embodiment the microcontroller 510 implements the functionality of the timing circuit 430 and boost circuit 440 of FIG. 4.

The first step in generating the erase waveform is for the microcontroller 510 to turn on (normally off) transistor Q3 acting as a switch using the EN signal, enabling power to the remainder of the circuit. It will be apparent to one of ordinary skill in the art that L1, D1, R2, Q1, C1, and feedback circuit 520 are components of a voltage boost converter circuit 540 controlled by microcontroller 510. The purpose of this circuit when operating is to generate a voltage (erase waveform voltage VE) which is greater than VDD on capacitor C1 and in parallel writing/drawing surface 200. The feedback circuit 520 indicates to the microcontroller 510 using the FB signal whether the boost converter circuit 540 output voltage on C1 is below a set level, in this case VE. While below the set level, the microcontroller 510 outputs a series of pulses on the BST signal, with each pulse causing the voltage on capacitor C1 to increase a little bit, until the set level is reached. Each pulse on the BST signal at voltage VDD turns on transistor Q1, acting as a switch, causing current to flow through the inductor L1 and storing energy in the inductor. When transistor Q1 is subsequently turned off by clearing BST to output 0V at the end of the pulse, this energy flows through the diode D1 into capacitor C1, increasing the voltage on the capacitor. Shottky diodes are typically preferred for diode D1 as their low forward voltage increases efficiency of the boost circuit. The BST signal is tuned to pulse at a frequency and duty cycle appropriate for the selected circuit components and voltage input/output levels to efficiently increase the voltage on capacitor C1 and thus also on the writing/drawing surface 200. Once the voltage on the capacitor C1 reaches the set level, the pulses on BST stop until the feedback circuit indicates that the voltage has dipped below the set level and one or more additional pulses are needed to reestablish the set level.

Figure 6B:
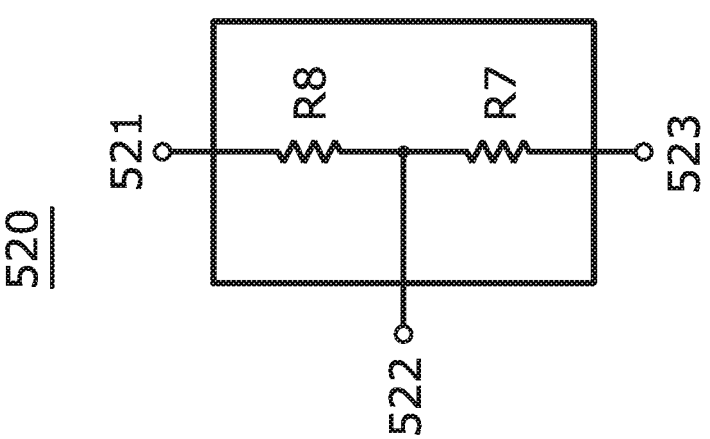
FIGS. 6A and 6B show multiple implementations of the feedback circuit in FIG. 5.
Figure 6A:
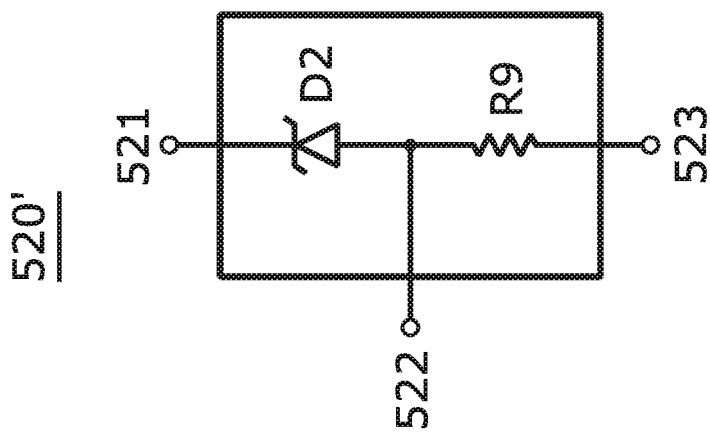

Alternative feedback circuit implementations 520 and 520' are provided in FIGS. 6A and 6B. A resistor divider feedback circuit is provided in FIG. 6A. This circuit results in a boost converter output voltage of $(1+R8/R7)*VFB$, where VFB is the voltage level to which the microcontroller 510 regulates its FB input via pumping/not pumping the boost converter (by pulsing/not pulsing its BST output). Values for (1+R8/R7) can easily range from 5 to 25 based on VFB and required output voltage level (VE). The multiplication of large (1+R8/R7) values by VFB in setting the output voltage level requires a highly accurate VFB in order to avoid large errors in the output voltage. Typically this requires a microcontroller with an internal comparator and voltage reference for use in regulating VFB. Note that prior art devices typically included these components in order to accurately generate the VFC (focal conic erase) voltage level.

A particularly suitable feedback circuit implementation 520' incorporating a Zener diode D2 is shown in FIG. 6B. With this circuit, the boost converter output voltage is regulated to (VFB+VZ), where VZ is the Zener diode voltage. In this circuit, uncertainty in VFB is added into the output voltage without multiplication by a large scale factor. This, in combination with the new erase waveforms requiring that only a single voltage-tolerant level VE be generated by the boost converter, permits the use of a general purpose digital input/output pin on the microcontroller 510 for input FB, eliminating the need for a voltage reference and comparator.

Alternative discharge circuit implementations 530, 530', 530" are provided in FIGS. 7A-C. The purpose of the discharge circuit is to generate the slow discharge portion from VE down to 0V at the end of one or more pulses of the erase waveform, which causes the writing/drawing surface 200 to switch to the dark focal conic texture. The circuit in FIG. 7A consists of a simple resistor R10, resulting in a well-known RC voltage discharge response once the boost converter is turned off. This feedback circuit does not require a discharge (DCHG) signal from the microcontroller 510 at the discharge circuit control input 532, possibly enabling the use of a smaller microcontroller device.

A small drawback of the discharge circuit in FIG. 7A is the current drawn from the boost converter output through the resistor R10 while the boost converter is enabled and generating VE. The discharge circuit 530' in FIG. 7B remedies this with the addition of a transistor Q4 acting as a switch under control of the discharge (DCHG) signal from the microcontroller 510 at the discharge circuit control input 532. The microcontroller 510 can turn off the transistor Q4 while the boost converter is enabled, saving power, and then turn it on for the slow discharge when the boost converter is disabled, enabling the output voltage to discharge through resistor R12.

The discharge circuit 530" in FIG. 7C features a transistor Q5 acting as a current-limited switch. The microcontroller can turn off the transistor Q5 (0V supplied to discharge circuit control input 532) when the boost converter is enabled, saving power, and then turn it on (VDD supplied to discharge circuit control input 532) for the slow discharge when the boost converter is disabled. The voltage across sense resistor R15 is proportional to the current being discharged from the boost converter output. The value of resistor R15 may be tuned such that transistor Q6 turns on at a desired discharge current. When higher discharge current turns the transistor Q6 on, current is drawn away from the base of the transistor Q5, creating a feedback which reduces the discharge current to the desired level. Such a discharge circuit may be used to produce the erase waveform shown in FIG. 3B.

Either of the circuits of FIG. 7B and 7C may be used to produce an erase waveform of the type shown in FIG. 3C. An erase waveform with a slow discharge portion 320" of this type may be created by pulsing the DCHG signal from the microcontroller 510 to reduce the output voltage to each of the individual step levels in the slow discharge portion 320".

Erase waveforms of the type shown in FIG. 3D could be implemented using the microcontroller-based system of FIG. 5 with the feedback circuits of FIGS. 6A-B and discharge circuits of FIGS. 7A-C. While FIG. 3D shows multiple pulses of the constant-current discharge type from FIG. 3B, it is understood that multiple pulses of the types shown in FIGS. 3A and 3C could be implemented as well. The programmability of microcontrollers reduces implementation of delays and additional pulses to firmware development easily performed by one of ordinary skill in the art in view of the instant disclosure.

Figure 8:
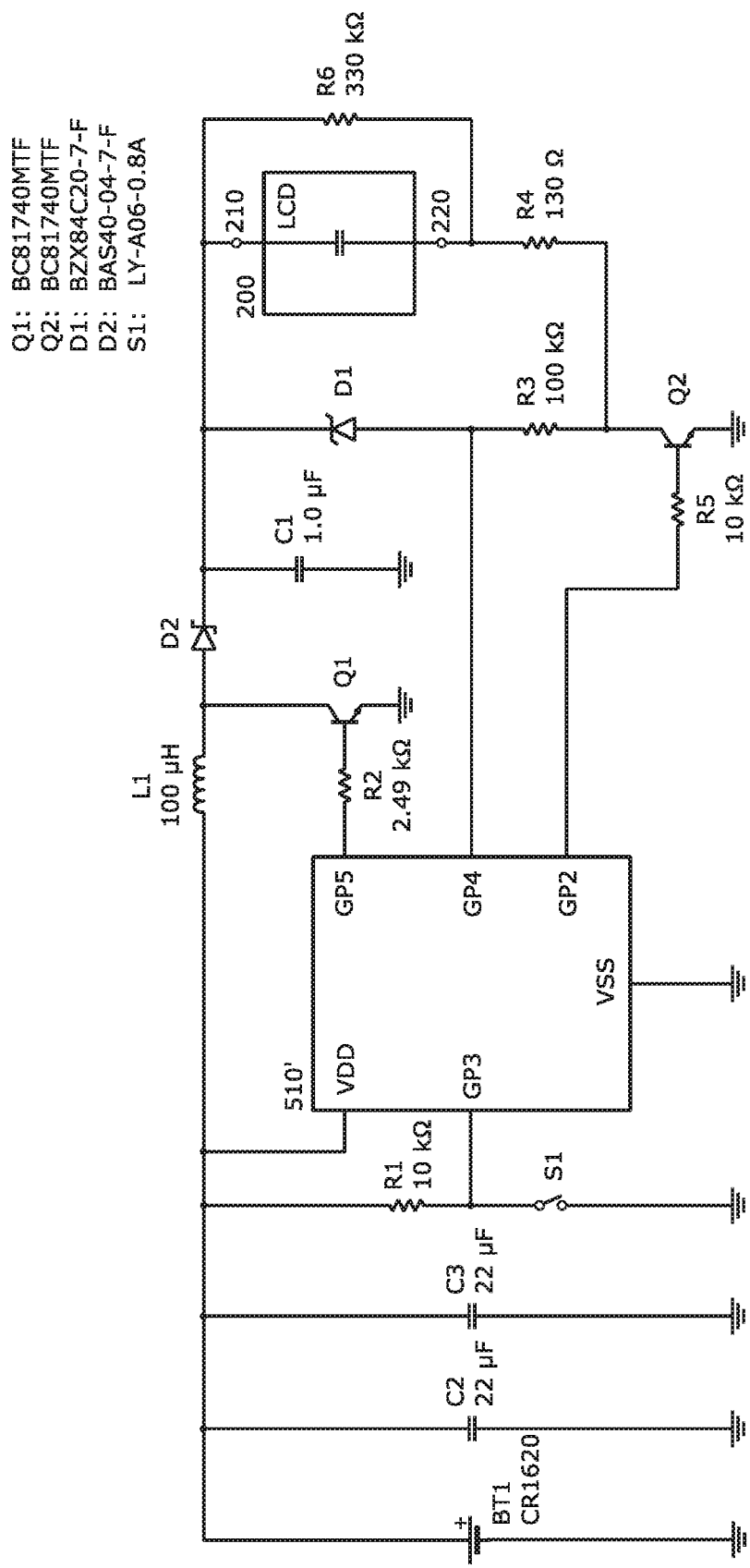
FIG. 8 shows another aspect of a controller-based system for a liquid crystal writing device of the present disclosure using a low-side switch to power down the feedback circuit, discharge circuit, and LCD between erases.

FIG. 8 presents an additional embodiment in which a low-side transistor Q2 acting as a switch is used rather than a high-side switch (for instance, transistor Q3 in FIG. 5) to prevent the feedback and discharge circuits from consuming power from VDD between erases, while also ensuring there is no voltage across the writing/drawing surface 200 (LCD) between erases. The microcontroller 510' (in this case a Microchip PIC 12F509) uses the EN signal from general purpose I/O pin GP2 to turn on transistor Q2 when the boost converter circuit functionality is enabled and generating VE. This enables the feedback circuit by providing the ground reference to resistor R3 and also enables VE to appear across the writing/drawing surface 200 by providing the ground reference to terminal 220. Note that when the transistor Q2 is turned off for a sufficient duration both of the writing/drawing surface 200 terminals 210 and 220 will be at the battery BT1 voltage level of VDD (0V across the writing/drawing surface), as will the feedback signal going to the microcontroller 510' general purpose I/O pin GP4. Resistor R6 functions as the discharge circuit and is always connected across writing/drawing surface terminals 210 and 220. Resistor R4 functions as a current-limiting resistor. General purpose I/O's GP3, GP4, and GP5 are used for the SW input, FB signal input, and BST signal output, respectively, as described for FIG. 5.

Bipolar Erase Waveform

In some embodiments, it may be desirable to combine the benefits of the slow discharge erase waveform with DC-balanced waveforms. For instance, large format eWriters used as whiteboards may have usage models and lifetime requirements which necessitate the use of DC-balanced waveforms, whereas drive circuitry cost is less of an issue. The benefits of the slow discharge erase waveform in reducing energy, reducing flash, reducing the number of voltage levels, and reducing the required voltage accuracy are still desirable.

FIGS. 9A-D provide four examples of slow discharge erase waveforms which are DC-balanced by the inclusion of a second identical erase pulse of opposite polarity. FIG. 10 provides an example of how to implement the waveforms of FIGS. 9A-C with the addition of suitable discharge circuits 530, 530', or 530" to the prior art display drive circuitry of FIG. 2. The two discharge circuits in FIG. 10 are identical and activated by control signals 274 and 275. Furthermore, high voltage supply 240 is configured to output the erase voltage VE.

Figure 9A:
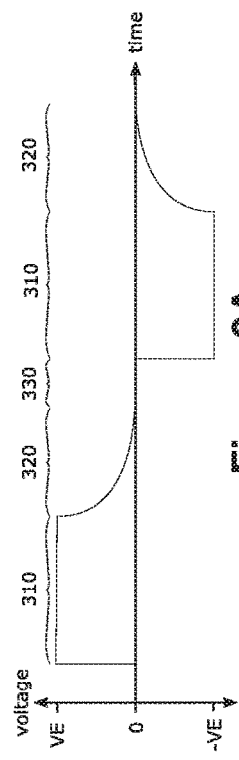
FIGS. 9A, 9B, 9C, and 9D show four DC-balanced erase waveforms with slow discharge of the subject matter of the present disclosure.
Figure 9B:
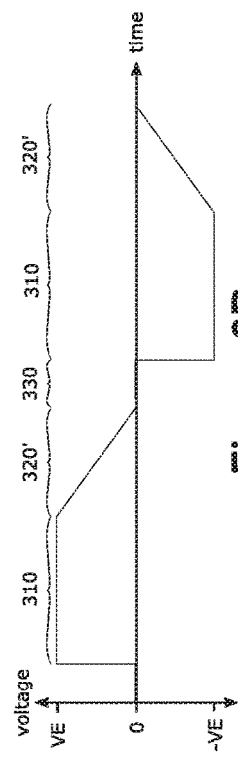
Figure 9C:
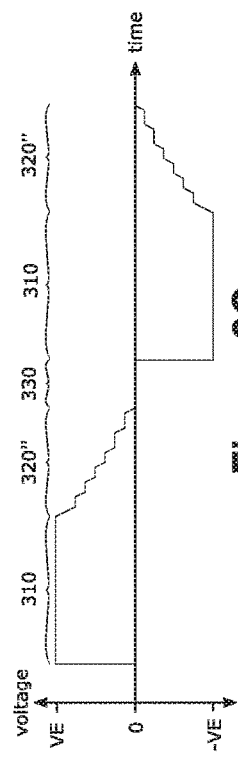
Figure 10:
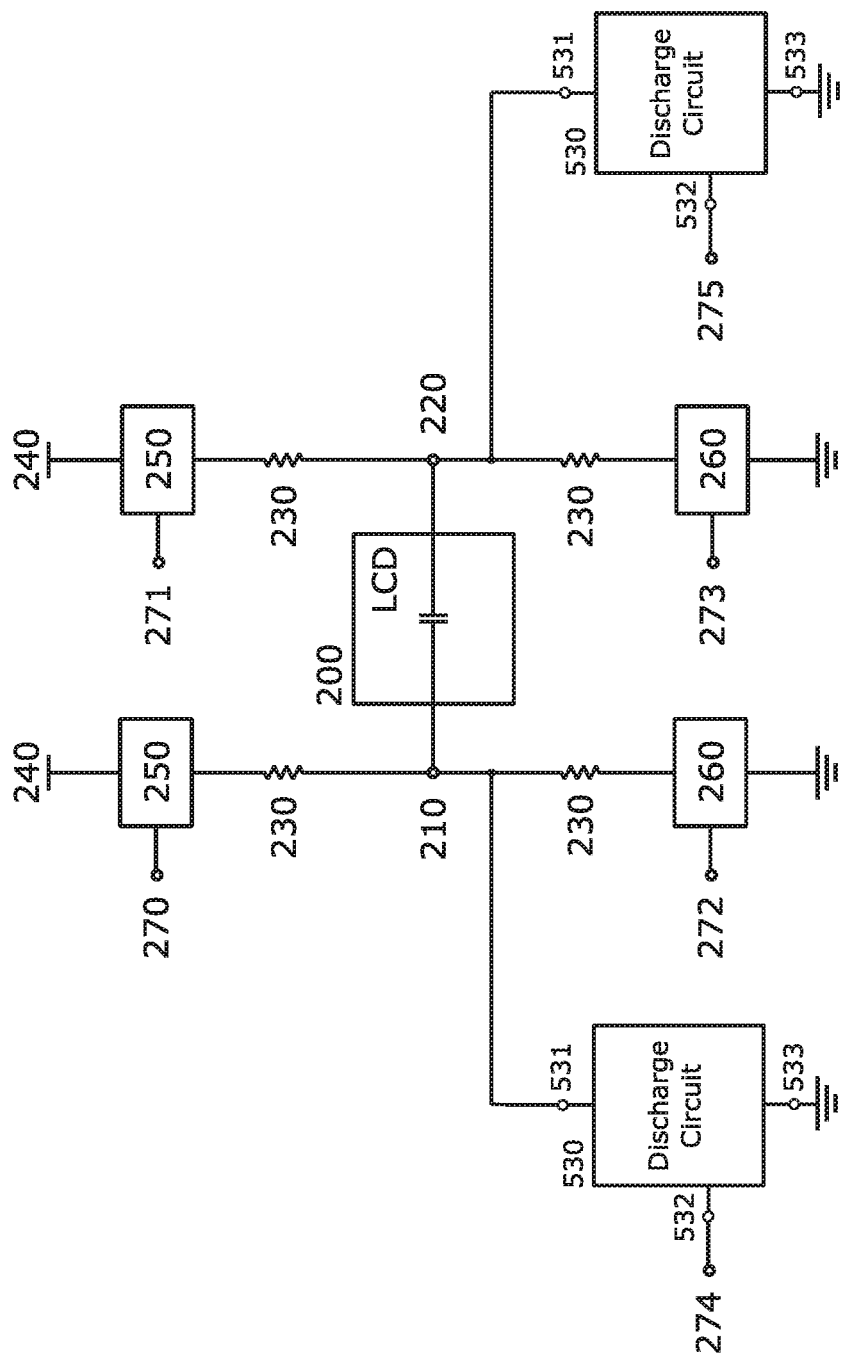
FIG. 10 shows a block diagram of the writing/drawing surface drive circuit for a liquid crystal writing device of the present disclosure adaptable to produce all of the erase waveforms in FIGS. 9A, 9B, and 9C.

The erase waveforms of FIGS. 9A-C may be produced by enabling high side driver control signal 270 and low side driver control signal 273 to charge the writing/drawing surface to voltage +VE (terminal 210 at VE and terminal 220 at 0V) for the waveform portion 310 at the VE level of time $t_e$. After this time, the high side driver control signal 270 may be disabled and the discharge circuit control signal 274 enabled for the slow discharge portion 320, 320', 320" of the +VE voltage pulse. After the pulse discharge time $t_d$, all driver control signals 270-275 may be disabled for a delay portion 330 between pulses.

The second drive pulse of opposing polarity is produced in an equivalent manner using the remaining half of the drive circuitry. Enabling high side driver control signal 271 and low side driver control signal 272 charges the writing/drawing surface to voltage −VE (terminal 210 at 0V and terminal 220 at VE) for the waveform portion 310 at the −VE level of time $t_e$. After this time, the high side driver control signal 271 may be disabled and the discharge circuit control signal 275 enabled for the slow discharge portion 320, 320', 320" of the −VE voltage pulse. After the pulse discharge time $t_d$, all driver control signals 270-275 may be disabled.

The discharge circuit 530 of FIG. 7A may be used to produce the RC discharge characteristic of FIG. 9A. As in the unipolar case, this discharge circuit does not require the control signals 274 and 275 but comes at the cost of drawing current from the high voltage supply 240 during the constant voltage 310 portions of the erase waveform. An equivalent effect can also be produced by a resistor placed across writing/drawing surface terminals 210 and 220. Discharge circuit 530' of FIG. 7B remedies the unwanted discharge during constant voltage 310 portions of the erase waveform in FIG. 9A by using transistor Q4 operated as a switch to disable discharge through R12 during constant voltage 310 portions of the erase waveform.

The discharge circuit 530" of FIG. 7C may be used to produce the constant-current discharge characteristic in FIG. 9B in a manner analogous to the constant-current discharge characteristic in the unipolar case. Finally, the slow discharge portions of the waveform 320" in FIG. 9C are produced using additional control to intermittently discharge the voltage across the liquid crystal capacitance (using discharge circuits 530' or 530") in order to produce an adjustable discharge characteristic consisting of a series of step levels.

Figure 2:
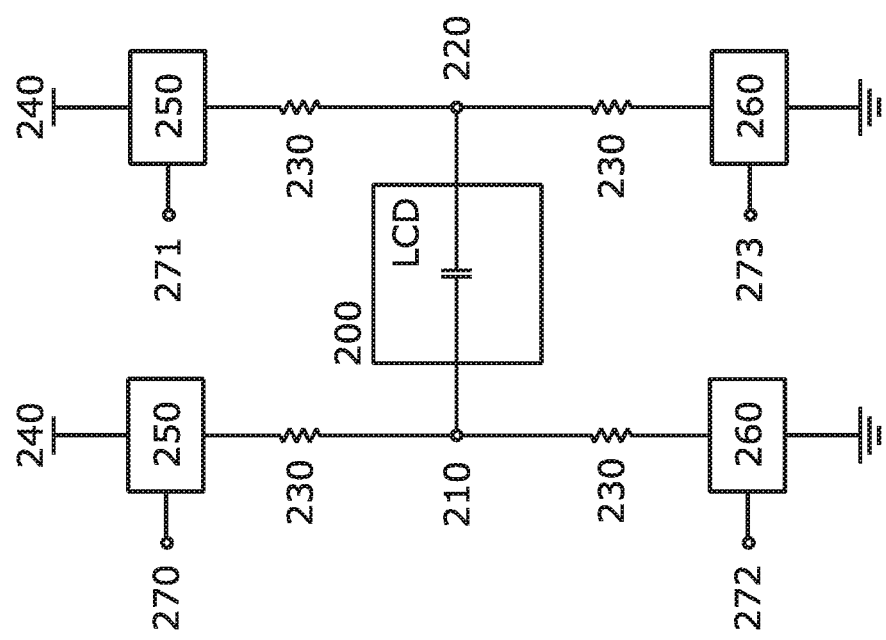
FIG. 2 shows a block diagram of the writing/drawing surface drive circuit used to produce the waveforms of FIG. 1A.
Figure 9D:
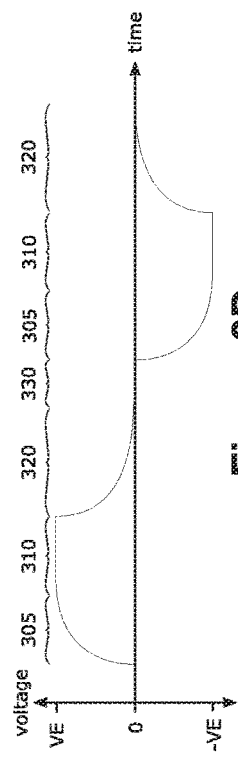

In another embodiment, the drive circuitry of the prior art in FIG. 2 is modified to produce the erase waveform of FIG. 9D. In particular, high voltage supply 240 is configured to output the erase voltage VE and the current-limiting resistors 230 connected to the low-side drivers 260 are increased in value to produce the desired RC discharge characteristic 320 of duration $t_d$. These larger valued resistors result in a significant RC charge characteristic 305 for the two pulses, which may be an acceptable performance versus cost tradeoff in some instances.

Figure 11:
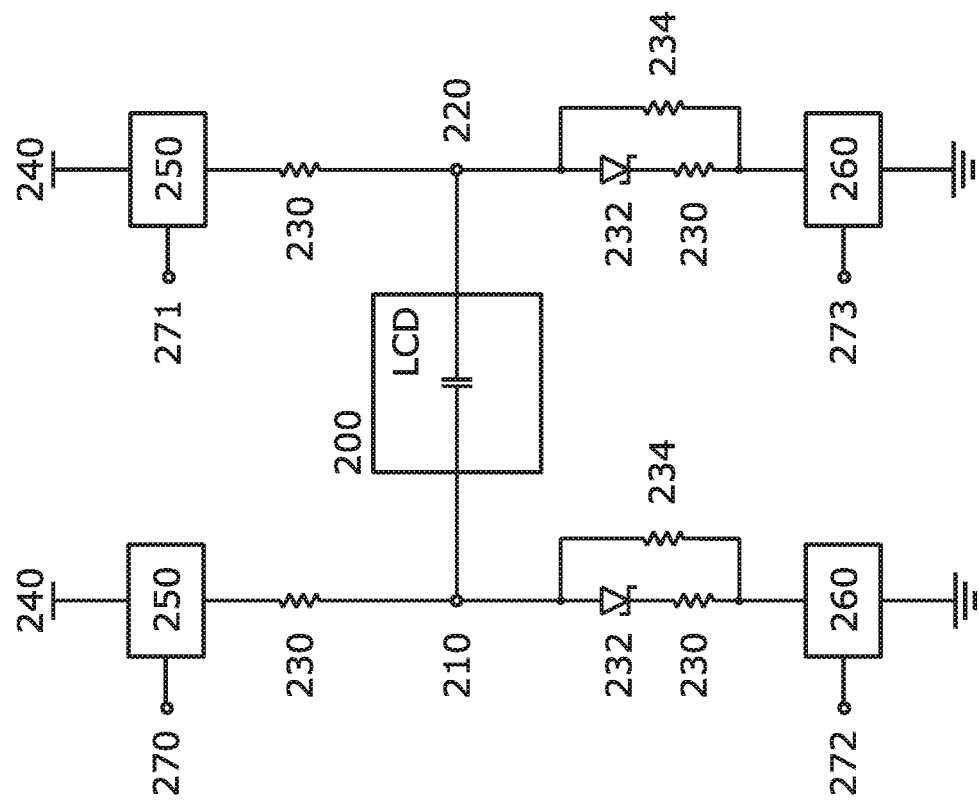
FIG. 11 shows another aspect of a block diagram of the writing/drawing surface drive circuit for a liquid crystal writing device for implementing the waveform of FIG. 9A according to the present disclosure.

A modification to the prior art drive circuitry of FIG. 2 is provided in FIG. 11. This implementation provides an efficient method of implementing the erase waveform of FIG. 9A. This implementation modifies the circuitry of FIG. 2 with diodes 232 and resistors 234. High voltage supply 240 is configured to output the erase voltage VE. Charging of the writing/drawing surface 200 occurs quickly through a diode 232 when the corresponding low side driver 260 and the high side driver 250 on the opposite side are enabled. However, the discharge portion of the waveform 320 occurs when both low side drivers 260 and neither high side driver 250 are enabled. For either polarity pulse, one of the diodes 232 will be blocking current, forcing the discharge current to pass through the corresponding discharge resistor 234. The size of the discharge resistors 234 can sized to produce the desired RC characteristic discharge duration.

The subject matter of the disclosure has been described hereinabove using specific examples and embodiments; however, it will be understood by one of ordinary skill in the art that various alternatives may be used and equivalents may be substituted for elements and/or steps described herein, without deviating from the scope of the disclosed subject matter. Modifications may be made to adapt the disclosed subject matter to a particular situation or to particular needs without departing from its scope. It is intended that the disclosure not be limited to the particular implementations and embodiments described herein, but that the claims be given their broadest interpretation to cover all embodiments, literal or equivalent, disclosed or not, covered thereby.

What is claimed is:

1. A liquid crystal writing device comprising:
   a dispersion of cholesteric liquid crystal and polymer;
   a flexible substrate on which a user applies pressure that changes a texture of said cholesteric liquid crystal to form an image;
   electrically conductive layers between which said dispersion is disposed;
   electronics adapted to apply an erase voltage waveform across said electrically conductive layers that forms a focal conic texture and erases said image, wherein said erase voltage waveform includes: i) an erase portion at an erase voltage VE, wherein said erase voltage VE≥VPH0, where VPH0 is a planar to homeotropic transition start voltage of said cholesteric liquid crystal, which is a first lowest voltage where a portion of said cholesteric liquid crystal in the planar texture changes to the homeotropic texture when applying a reference square pulse of a periodic nature and of same duration as said erase portion, and ii) a slow discharge portion that lasts for a time td that is at least 10 ms; and
   wherein said electronics comprise a boost converter circuit including an output terminal at said erase voltage VE, wherein said erase voltage waveform is applied across said electrically conductive layers and including a resistor at a resistance selected to produce the slow discharge portion of said erase voltage waveform.

2. The liquid crystal writing device of claim 1 wherein said time td is any of the following: at least 25 ms, at least 50 ms, at least 56 ms, at least 64 ms, at least 80 ms; at least 150 ms, at least 0.5 second, at least 1 second; at least 2 seconds; at least 3 seconds; and at least 10 seconds.

3. The liquid crystal writing device of claim 1 wherein said erase voltage waveform is a unipolar waveform.

4. The liquid crystal writing device of claim 1 wherein said erase voltage waveform is a bipolar waveform.

5. The liquid crystal writing device of claim 1, wherein said erase voltage waveform includes a plurality of said erase portions with corresponding slow discharge portions.

6. The liquid crystal writing device of claim 1 wherein said erase voltage VE>VPH and said erase voltage VE>VFH, wherein VPH is a planar to homeotropic transition voltage VFH is a focal conic to homeotropic transition voltage.

7. The liquid crystal writing device of claim 1 wherein said erase portion of said erase voltage waveform lasts for a time to which is at least 150 ms.

8. The liquid crystal writing device of claim 1 wherein said electronics comprise a timing circuit, a switch and a regulated power source or a battery for providing power including voltage input te said boost converter circuit, wherein said timing circuit is adapted to detect a signal from said switch enabling said timing circuit to send an enable signal to an input of said boost converter circuit whereby said boost converter circuit outputs said erase voltage VE.

9. The liquid crystal writing device of claim 1 wherein said electronics comprise a switch and a regulated power source or a battery for providing power to said electronic circuitry including voltage input to said boost converter circuit, wherein a duration at which said switch is activated controls a duration of an enable signal to an input of said boost converter circuit whereby said boost converter circuit outputs said erase voltage VE.

10. A liquid crystal writing device comprising:
a dispersion of cholesteric liquid crystal and polymer;
a flexible substrate on which a user applies pressure that changes a texture of said cholesteric liquid crystal to form an image;
electrically conductive layers between which said dispersion is disposed;
electronics adapted to apply an erase voltage waveform across said electrically conductive layers that forms a focal conic texture and erases said image, wherein said erase voltage waveform includes: i) an erase portion at an erase voltage VE, wherein said erase voltage VE≥VPH0, where VPH0 is a planar to homeotropic transition start voltage of said cholesteric liquid crystal, which is a first lowest voltage where a portion of said cholesteric liquid crystal in the planar texture changes to the homeotropic texture when applying a reference square pulse of a periodic nature and of same duration as said erase portion, and ii) a slow discharge portion that lasts for a time td that is at least 10 ms; and
wherein said electronics provide said slow discharge portion of said erase voltage waveform with voltage discharge at constant current.

11. A liquid crystal writing device comprising:
a dispersion of cholesteric liquid crystal and polymer;
a flexible substrate on which a user applies pressure that changes a texture of said cholesteric liquid crystal to form an image;
electrically conductive layers between which said dispersion is disposed;
electronics adapted to apply an erase voltage waveform across said electrically conductive layers that forms a focal conic texture and erases said image, wherein said erase voltage waveform includes: i) an erase portion at an erase voltage VE, wherein said erase voltage VE≥VPH0, where VPH0 is a planar to homeotropic transition start voltage of said cholesteric liquid crystal, which is a first lowest voltage where a portion of said cholesteric liquid crystal in the planar texture changes to the homeotropic texture when applying a reference square pulse of a periodic nature and of same duration as said erase portion, and ii) a slow discharge portion that lasts for a time td that is at least 10 ms: and
wherein said electronics comprise a regulated power source or battery for providing power voltage VDD and a boost converter circuit including an output terminal at a voltage equal to said erase voltage VE plus power voltage VDD, wherein one of said electrically conductive layers is at said output terminal voltage and another of said electrically conductive layers is at said power voltage VDD, and a resistor is configured to produce a desired duration of the slow discharge portion of said erase voltage waveform.

12. A cholesteric liquid crystal eWriter that forms an image by applying pressure to a writing/drawing surface comprising a liquid crystal layer including a dispersion of cholesteric liquid crystal material and polymer, and electrically conductive layers between which said liquid crystal layer is disposed, wherein electronics of said eWriter are adapted to apply an erase voltage waveform across said electrically conductive layers that forms a focal conic texture and erases the image, said erase voltage waveform including an erase portion and a slow discharge portion, said electronics comprising:
a regulated power source or a battery having a voltage VDD;
a controller including a voltage VDD input, a switch SW input, an enable EN output, a boost BST output, a feedback FB input and an optional discharge DCHG output;
a transistor Q3 acting as a switch controlled by an enable signal from said enable EN output of said controller;
a boost converter circuit including: a transistor Q1 acting as a switch controlled by a boost signal from said BST output of said controller, a diode, an inductor located between said switch Q3 and said diode, and a capacitor C1 in parallel with said writing/drawing surface;
said boost converter circuit including a feedback circuit configured to provide feedback to said FB input of said controller based on a boost converter output voltage from said boost converter circuit;
a discharge circuit optionally under control of a discharge signal from said DCHG output of said controller;
wherein in response to a control signal instructing erase of the image applied to said switch SW input, said controller turns on said transistor Q3 applying said voltage VDD to said boost converter circuit, said feedback circuit indicates to said controller via said feedback FB input when said boost converter output voltage is below a set level, resulting in said controller enabling said signal from said output BST that turns on said transistor Q1 and causes energy to be stored in said inductor, wherein when said controller subsequently turns off said transistor Q1, said energy stored in said inductor is discharged through said diode increasing said erase voltage on said capacitor C1 and increasing said erase voltage in said parallel writing/drawing surface forming said erase portion of said erase voltage waveform, and said discharge circuit produces said slow discharge portion of said erase voltage waveform.

13. The liquid crystal writing device of claim 12 wherein said erase portion of said erase voltage waveform is instantaneous.

14. The liquid crystal writing device of claim 12 wherein said electronics provide said slow discharge portion of said erase voltage waveform with a stepped discharge characteristic.

15. The liquid crystal writing device of claim 12, wherein said feedback circuit includes a resistive voltage divider adapted to produce said FB input to said controller as a scaled version of said boost converter output voltage, said boost converter output voltage regulating to a scaled value of VFB, where VFB is the voltage level to which said controller regulates said FB input by pumping or not pumping said boost converter circuit, wherein said pumping of said boost converter circuit outputs a series of pulses on the BST signal, with each pulse causing the voltage on capacitor C1 to increase, until said boost converter output voltage reaches the set level.

16. The liquid crystal writing device of claim 12, wherein said feedback circuit includes a Zener diode and a resistor, said feedback circuit being adapted to regulate said boost converter output voltage to VFB plus VZ, where VZ is the Zener diode voltage and VFB is the voltage level to which said controller regulates its FB input by pumping/not pumping said boost converter circuit, wherein said pumping of said boost converter circuit outputs a series of pulses on the BST signal, with each pulse causing the voltage on capacitor C1 to increase, until said boost converter output voltage reaches the set level.

17. The liquid crystal writing device of claim 12 wherein said discharge circuit includes a resistor configured to provide an RC discharge characteristic to said slow discharge portion of said erase voltage waveform.

18. The liquid crystal writing device of claim 12 wherein said discharge circuit includes a resistor and a transistor Q4 acting as a switch that is under control of said discharge signal DCHG output from said controller, wherein said controller turns OFF said transistor Q4 while said boost converter circuit is enabled, saving power, and then turns ON said transistor Q4 when said boost converter circuit is disabled, enabling said boost converter circuit output voltage to discharge through said resistor.

19. The liquid crystal writing device of claim 12 wherein said discharge circuit is configured to form said slow discharge portion of said erase voltage waveform by discharging voltage at constant current.

20. The liquid crystal writing device of claim 12 wherein said discharge circuit includes a transistor Q5 acting as a current-limited switch that is under control of said discharge signal from said DCHG output of said controller, a sense resistor R15 that produces a voltage proportional to the current being discharged from the boost converter circuit output through said transistor Q5, and a transistor Q6 that limits the discharge current by drawing current away from the base of said transistor Q5 when the voltage across the sense resistor becomes large enough to turn on said transistor Q6, wherein said controller turns OFF said transistor Q5 while said boost converter circuit is enabled, saving power, and then turns ON said transistor Q5 when said boost converter circuit is disabled, enabling said boost converter output voltage to discharge at the current limit set by the sense resistor R15.

21. A cholesteric liquid crystal eWriter that forms an image by applying pressure to a writing/drawing surface comprising a liquid crystal layer including a dispersion of cholesteric liquid crystal material and polymer, and electrically conductive layers between which said liquid crystal layer is disposed, wherein electronics of said eWriter are adapted to apply an erase voltage waveform across said electrically conductive layers that forms a focal conic texture and erases the image, said erase voltage waveform including an erase portion and a slow discharge portion, said electronics comprising:
  a regulated power source or a battery having a voltage VDD;
  a controller including a voltage VDD input, a switch SW input, an enable EN output, a boost BST output, and a feedback FB input;
  a transistor Q2 acting as a low-side switch controlled by an enable signal from said EN output of said controller and referenced to ground;
  a boost converter circuit including a transistor Q1 acting as a switch controlled by a boost signal from said BST output of said controller, an inductor, a diode D2, a capacitor C1 electrically connected to the cathode of diode D2 and to a first one of said electrically conductive layers,
  a voltage on said capacitor C1 being an output from said boost converter circuit;
  said boost converter circuit including a feedback circuit configured to provide feedback to said FB input of said controller;
  an optional current limiting resistor located in a path between a second of said electrically conductive layers and said transistor Q2;
  a discharge resistor R6 connected across said electrically conductive layers;
  wherein in response to a control signal instructing erase of the image said controller turns on said transistor Q2 providing the ground reference to said boost converter circuit, said feedback circuit being configured to indicate to said controller when a boost converter voltage appearing on said capacitor C1 output from said boost converter circuit is below a set level, resulting in said controller enabling said boost signal that turns ON said transistor Q1 and causes energy to be stored in said inductor, wherein when said controller subsequently turns OFF said transistor Q1, said energy stored in said inductor is discharged through said diode D2 increasing voltage on said capacitor C1 and increasing said erase voltage across said writing/drawing surface to form said erase portion of said erase voltage waveform, and said discharge resistor R6 produces said slow discharge portion of said erase voltage waveform.

22. The liquid crystal writing device of claim 21 wherein said controller comprises three general purpose digital input/output pins: one for said FB input, one for said BST output and one for said enable EN output.

23. The liquid crystal writing device of claim 22 wherein said controller includes a fourth general purpose input/output pin coupled to a user controlled switch adapted to produce said control signal that initiates application of said erase voltage.

24. The liquid crystal writing device of claim 21 wherein said controller is a microcontroller.

* * * * *